June 10, 1947.  L. N. VANDERVOORT  2,421,974
SWIVEL FITTING
Filed Sept. 22, 1944
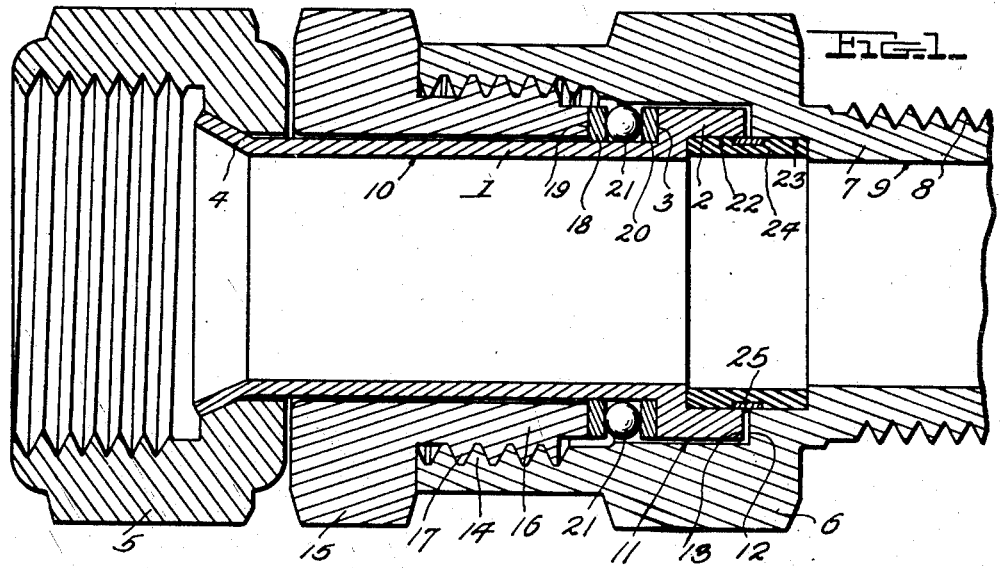
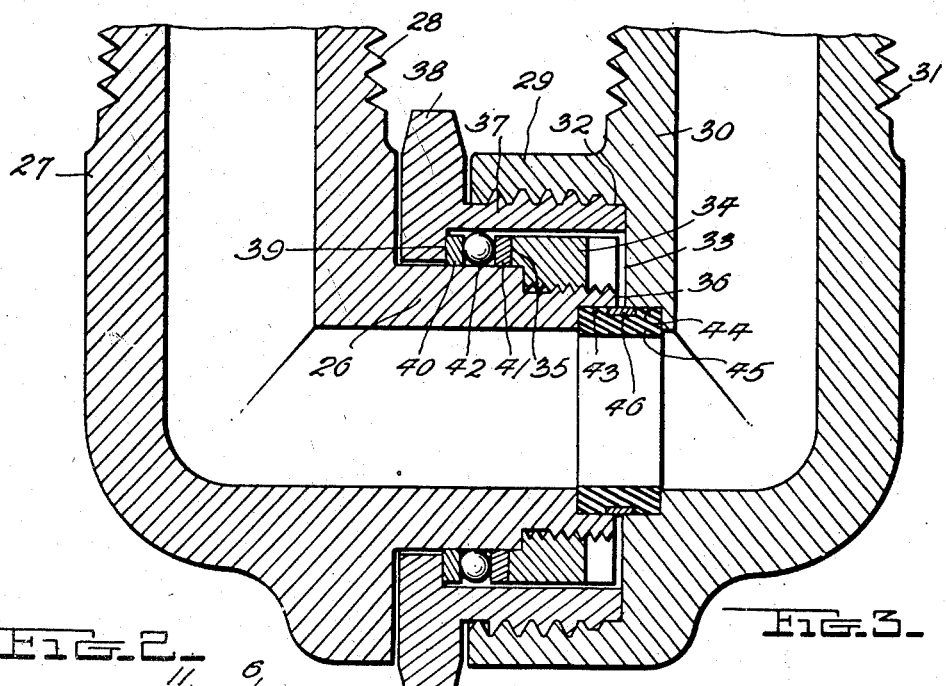
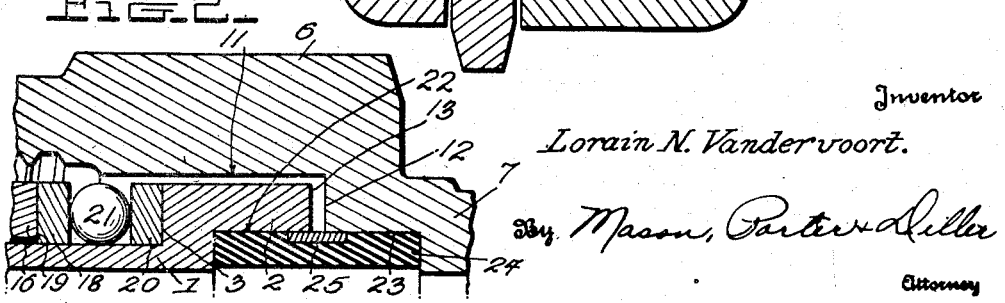
Inventor
Lorain N. Vandervoort.
By Mason, Porter & Diller
Attorney Patented June 10, 1947

2,421,974

UNITED STATES PATENT OFFICE 2,421,974

SWIVEL FITTING

Lorain N. Vandervoort, Cleveland, Ohio, assignor to The Parker Appliance Company, Cleveland, Ohio, a corporation of Ohio Application September 22, 1944, Serial No. 555,317

2 Claims. (Cl. 285—97.3)

The invention relates to new and useful improvements in a swivel fitting having a bore therethrough for the passing of liquids.

An object of the invention is to provide a swivel fitting including an inner and outer sleeve rotatively connected with a gasket for sealing the joint between said sleeves which gasket is disposed in counter-bored recesses formed in the sleeves adjacent the joint thereof.

A further object of the invention is to provide a swivel fitting of the above type wherein a metal sleeve is placed between the gasket and the fitting sleeves so as to overlie the joint and prevent the pressure on the fluid passing through the fitting from forcing the gasket material into the joint.

These and other objects will in part be obvious and will in part be hereinafter more fully disclosed.

In the drawings,

Figure 1 is a longitudinal sectional view through a swivel connection embodying the improvements;

Figure 2 is an enlarged detail in longitudinal section of the fitting sleeves in the region where they are joined;

Figure 3 in a view showing the improved fitting as applied to the connection of elbows.

In Figures 1 and 2 of the drawings the swivel fitting is shown as applied to a straight line through which a fluid is passed. The fitting includes an inner sleeve 1 having an enlarged portion 2 at one end providing a shoulder 3 for a bearing. The sleeve 1 at its other end is shown as flared, as indicated at 4 and a sleeve nut 5 is placed on the sleeve 1 before it is flared and serves to clamp the flared end of the sleeve 1 against the part to which it is to be attached.

The fitting also includes an outer sleeve 6. The portion 7 of this outer sleeve is threaded as indicated at 8 for connection to any suitable device. This outer sleeve has a bore 9 therethrough which is of substantially the same size as the bore 10, through the inner sleeve 1. Said outer sleeve is counter-bored as indicated at 11 to provide a shoulder 12. This counter-bore 11 is so dimensioned that the inner sleeve with the enlarged head 2 may be telescoped within the outer sleeve and the end of the inner sleeve 13 brought into close abutted relation with the shoulder 12.

The outer sleeve 6 has an internal thread 14. A nut 15 provided with an extension 16 closely fits the sleeve 1 and has a thread 17 on its exterior adapted to engage the thread 14 on the sleeve 6. A metal ring 18 abuts against the end 19 of the extension 16 and a metal ring 20 engages the shoulder 3 on the inner sleeve 1. A series of balls 21 are placed between these metal rings 18 and 20. This forms a connection between the inner and outer rings which permits the rings to rotate freely relative to each other. The sleeve 6 may be secured to a fixed part or a part which is to rotate, and likewise the sleeve 1 may be connected to a fixed part or to a part which is to rotate.

The sleeve 1 is counter-bored at the inner end thereof as indicated at 22. The sleeve 6 is counter-bored in the region adjacent the shoulder 12 as indicated at 23. These counter-bores 22 and 23 are of the same diameter and this forms a cylindrical recess in which a sleeve gasket or packing 24 is placed. This gasket extends to both sides of the joint between the end 13 of the inner sleeve and the shoulder 12 of the outer sleeve. The sleeve gasket has a bore therethrough which is preferably slightly greater than the bore of the sleeves of the fittings so that its inner portion does not in any way obstruct the flow of fluid through the fitting.

A metal ring 25 surrounds the packing gasket. The ring fits into an annular groove or recess in the outer surface of the packing and is of an outer diameter substantially the same as the diameter of the bores 22 and 23. This ring extends across the joint or gap between the inner and outer sleeve and would prevent any pressure on the fluid passing through the swivel fitting from forcing the material of the packing gasket into this joint.

In Figure 3 of the drawings there is shown a slightly modified form of construction. The inner sleeve 26 of the swivel fitting is provided with an elbow 27 having a thread 28 by which the elbow may be connected to any suitable device. The outer sleeve 29 is likewise provided with an elbow 30 which has a thread 31 adapted to be connected with any suitable device. The bore through the elbows and the inner and outer sleeves for the passage of fluid is substantially uniform throughout. The sleeve 29 is provided with a counter-bore 32 and the sleeve 26 has a portion thereof extending into this counter-bore. The counter-bore 32 forms a shoulder 33. Threaded onto the inner end of the sleeve 26 is a collar 34 which provides a bearing shoulder 35. The end of the inner sleeve 36 is placed adjacent the shoulder 33. Threaded into the bore 32 is an extension 37 of a nut 38. Said nut has a shoulder 39. A metal bearing ring 40 is placed against the shoulder 39 and a metal bearing ring 41 is placed against the shoulder 35. A series of balls 42 are placed between the bearing rings and serve to hold the fitting sleeves in rotative engagement with each other. The nut 38 and the bearing parts are placed on the inner sleeve 26 after which the collar 34 is threaded thereon. The inner end of the sleeve 23 is counter-bored at 43 and likewise the sleeve 29 is counter-bored adjacent the shoulder 33, as indicated at 44. These counter-bores 43 and 44 are of the same diameter and provide a recess for a sleeve gasket or packing 45.

This packing gasket 45 is provided with an annular recess on its outer face and a metal ring 46 is placed in said recess. The outer diameter of this metal ring 46 is substantially the same as the diameter of the bores 43 and 44. The gasket extends to both sides of the joint between the end of the inner sleeve and the shoulder 33 of the outer sleeve. This metal ring 46 also spans this opening and will prevent fluid pressure passing between the bores of the fitting sleeves from forcing the gasket material into the joint.

It is obvious that many changes in the details of construction and the arrangement of parts may be made without departing from the spirit of the invention as set forth in the appended claims.

I claim:

1. A swivel fitting comprising inner and outer sleeves having a common bore therethrough for the passing of fluid, said outer sleeve having a counter-bore providing a recess terminating in a shoulder and adapted to receive the end portion of the inner sleeve with the end thereof in close abutting relation to said shoulder, means for rotatively joining said sleeves, the end of said inner sleeve and the outer sleeve adjacent said shoulder being counter-bored to provide an annular recess, a sleeve of packing material disposed in said last-named recess and sealing the joint between the fitting sleeves, a metal sleeve embedded in the outer face of said packing sleeve and disposed so as to extend across the joint between the fitting sleeves for preventing the packing material from being forced into the joint by the pressure of the passing fluid on the packing sleeve.

2. A swivel fitting comprising inner and outer sleeves having a common bore therethrough for the passing of fluid, said outer sleeve having a counter-bore providing a recess terminating in a shoulder and adapted to receive the end portion of the inner sleeve with the end thereof in close abutting relation to said shoulder, said inner sleeve having a bearing shoulder within the outer sleeve, a member surrounding said inner sleeve and having a threaded connection with the outer sleeve and extending into said outer sleeve and providing a bearing surface at its inner end, a ball bearing disposed between the bearing shoulder on said inner sleeve and the end of said extension, the end of said inner sleeve and the outer sleeve adjacent said shoulder thereon being counter-bored to provide a recess and a sleeve of packing material disposed in said last-named recess and sealing the joint between the fitting sleeves, a metal sleeve embedded in the outer face of said packing sleeve and disposed so as to extend across the joint between the fitting sleeves for preventing the packing material from being forced into the joint by the pressure of the passing fluid on the packing sleeve.

LORAIN N. VANDERVOORT.

REFERENCES CITED

The following references are of record in the file of this patent:

UNITED STATES PATENTS

| Number | Name | Date |
|---|---|---|
| 1,485,252 | Denis | Feb. 26, 1924 |
| 1,961,583 | Hamer | June 5, 1934 |
| 1,928,076 | Rudolph | Sept. 26, 1933 |

FOREIGN PATENTS

| Number | Country | Date |
|---|---|---|
| 385,518 | Germany | Jan. 11, 1922 |